United States Patent
Shin et al.

(10) Patent No.: US 12,275,639 B2
(45) Date of Patent: Apr. 15, 2025

(54) METHOD FOR PREPARING HYDROGEN GAS

(71) Applicants: HYUNDAI MOTOR COMPANY, Seoul (KR); Kia Corporation, Seoul (KR)

(72) Inventors: Byeong Soo Shin, Uiwang-si (KR); Kyung Moon Lee, Uiwang-si (KR); Young Jin Cho, Gimhae-si (KR); Yong Ha Park, Suwon-si (KR); Hoon Mo Park, Seongnam-si (KR); Dong Hoon Nam, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 498 days.

(21) Appl. No.: 17/874,248

(22) Filed: Jul. 26, 2022

(65) Prior Publication Data

US 2023/0286800 A1 Sep. 14, 2023

(30) Foreign Application Priority Data

Mar. 8, 2022 (KR) .................. 10-2022-0029659

(51) Int. Cl.
*B01D 53/04* (2006.01)
*B01D 53/047* (2006.01)
*C01B 3/04* (2006.01)
*C01B 3/56* (2006.01)

(52) U.S. Cl.
CPC ............ *C01B 3/56* (2013.01); *B01D 53/0462* (2013.01); *B01D 53/047* (2013.01); *C01B 3/047* (2013.01); *B01D 2253/102* (2013.01); *B01D 2253/108* (2013.01); *B01D 2257/102* (2013.01); *B01D 2257/404* (2013.01); *B01D 2257/406* (2013.01); *B01D 2259/403* (2013.01); *C01B 2203/0277* (2013.01); *C01B 2203/042* (2013.01); *C01B 2203/08* (2013.01); *C01B 2203/1205* (2013.01)

(58) Field of Classification Search
CPC ........ B01D 53/04; B01D 53/047; C01B 3/04; C01B 3/56; C01B 3/382
See application file for complete search history.

(56) References Cited

U.S. PATENT DOCUMENTS

2022/0119250 A1 4/2022 Shin et al.

FOREIGN PATENT DOCUMENTS

| JP | WO2018-116982 A1 | 10/2019 | |
|---|---|---|---|
| KR | 10-2159237 B1 | 9/2020 | |
| KR | 10-2247199 B1 | 5/2021 | |
| KR | 10-2022-0052186 A | 4/2022 | |
| WO | WO-2018116982 A1 * | 6/2018 | ............ B01D 53/04 |

* cited by examiner

*Primary Examiner* — Sharon Pregler
(74) *Attorney, Agent, or Firm* — MORGAN, LEWIS & BOCKIUS LLP (57) ABSTRACT

A method for preparing hydrogen gas includes a decomposition step, a first adsorption step, a second adsorption step, a first regeneration step, a third heat-exchange step, and a second regeneration step.

17 Claims, 11 Drawing Sheets

| Step | A | | | | | B | | | | |
|---|---|---|---|---|---|---|---|---|---|---|
| sub step | A1 | A2 | A3 | A4 | A5 | B1 | B2 | B3 | B4 | B5 |
| BED1 | ADSORBING | | | | | HEATING AND CONNECTING | HEATING / DISCHARGING | | | ADSORBING AND CONNECTING |
| BED2 | COOLING / CLEANING | COOLING AND CONNECTING | STANDBY | PRESSURIZING | ADSORBING AND CONNECTING | ADSORBING | | | | |
| BED3 | HEATING AND CONNECTING | HEATING / DISCHARGING | | | | | COOLING AND CONNECTING | STANDBY | PRESSURIZING | ADSORBING AND CONNECTING |
| BED4 | HEATING AND CONNECTING | | | COOLING / CLEANING | | HEATING AND CONNECTING | COOLING AND CONNECTING | COOLING / CLEANING | | |

FIG. 4A

| Step | C | | | | | D | | | | |
|---|---|---|---|---|---|---|---|---|---|---|
| sub step | C1 | C2 | C3 | C4 | C5 | C1 | C2 | C3 | C4 | C5 |
| BED1 | HEATING AND CONNECTING | COOLING AND CONNECTING | COOLING / CLEANING | | | | COOLING AND CONNECTING | STANDBY | PRESSURIZING | ADSORBING AND CONNECTING |
| BED2 | HEATING AND CONNECTING | | HEATING / DISCHARGING | | | HEATING AND CONNECTING | COOLING AND CONNECTING | COOLING / CLEANING | | |
| BED3 | ADSORBING AND CONNECTING | | ADSORBING | | ADSORBING AND CONNECTING | HEATING AND CONNECTING | | HEATING / DISCHARGING | | |
| BED4 | | COOLING AND CONNECTING | STANDBY | PRESSURIZING | ADSORBING AND CONNECTING | | | ADSORBING | | ADSORBING AND CONNECTING |

FIG. 4B

| Step | A | | | | | B | | | | | C | | | | |
|---|---|---|---|---|---|---|---|---|---|---|---|---|---|---|---|
| sub step | A1 | A2 | A3 | A4 | A5 | B1 | B2 | B3 | B4 | B5 | C1 | C2 | C3 | C4 | C5 |
| BED1 | ADSORBING | | | | ADSORBING AND CONNECTING | HEATING AND CONNECTING | HEATING / DISCHARGING | | | | | | | | ADSORBING AND CONNECTING |
| BED2 | COOLING / CLEANING | COOLING AND CONNECTING | STANDBY | PRESSURIZING | ADSORBING AND CONNECTING | ADSORBING | | | | ADSORBING AND CONNECTING | HEATING AND CONNECTING | HEATING / DISCHARGING | | | ADSORBING AND CONNECTING |
| BED3 | COOLING AND CONNECTING | COOLING / CLEANING | | | | | | STANDBY | PRESSURIZING | ADSORBING AND CONNECTING | ADSORBING | | | | |
| BED4 | HEATING AND CONNECTING | HEATING / DISCHARGING | | | | | COOLING / CLEANING | | | | | COOLING AND CONNECTING | STANDBY | PRESSURIZING | |
| BED5 | HEATING / DISCHARGING | | | | | HEATING AND CONNECTING | HEATING / DISCHARGING | | | | COOLING / CLEANING | | | | |
| BED6 | HEATING AND CONNECTING | | | | | | | | | | HEATING AND CONNECTING | COOLING / CLEANING | | | |

FIG. 5A

| Step | D | | | | | E | | | | | F | | | | |
|---|---|---|---|---|---|---|---|---|---|---|---|---|---|---|---|
| sub step | D1 | D2 | D3 | D4 | D5 | E1 | E2 | E3 | E4 | E5 | F1 | F2 | F3 | F4 | F5 |
| BED1 | HEATING AND CONNECTING | COOLING AND CONNECTING | HEATING/DISCHARGING | | | COOLING / CLEANING | | | | | COOLING AND CONNECTING | STANDBY | PRESSURIZING | ADSORBING AND CONNECTING |
| BED2 | HEATING/DISCHARGING | | | | | HEATING AND CONNECTING | COOLING AND CONNECTING | COOLING / CLEANING | | | | | | | |
| BED3 | HEATING AND CONNECTING | | | | | HEATING/DISCHARGING | | | | | HEATING AND CONNECTING | COOLING AND CONNECTING | COOLING / CLEANING | | |
| BED4 | ADSORBING | | | | ADSORBING AND CONNECTING | ADSORBING AND CONNECTING | HEATING/DISCHARGING | | | | | | | | |
| BED5 | | COOLING AND CONNECTING | STANDBY | PRESSURIZING | ADSORBING AND CONNECTING | ADSORBING AND CONNECTING | ADSORBING | | | | ADSORBING AND CONNECTING | HEATING AND CONNECTING | HEATING/DISCHARGING | | |
| BED6 | COOLING / CLEANING | | | | | | COOLING AND CONNECTING | STANDBY | PRESSURIZING | ADSORBING AND CONNECTING | ADSORBING | | | | ADSORBING AND CONNECTING |

FIG. 5B

| Step | A | | | | | B | | | | | C | | | | |
|---|---|---|---|---|---|---|---|---|---|---|---|---|---|---|---|
| sub step | A1 | A2 | A3 | A4 | A5 | B1 | B2 | B3 | B4 | B5 | C1 | C2 | C3 | C4 | C5 |
| BED1 | ADSORBING | | | | | HEATING - CONNECTING | HEATING - DISCHARGING | | | | | | | | |
| BED2 | | COOLING - CONNECTING | STANDBY | PRESSURIZING | ADSORBING - CONNECTING | ADSORBING | | | | | ADSORBING - CONNECTING | HEATING - CONNECTING | HEATING - DISCHARGING | | |
| BED3 | | | COOLING - CLEANING | | ADSORBING - CONNECTING | | COOLING - CONNECTING | STANDBY | PRESSURIZING | ADSORBING - CONNECTING | ADSORBING | | | | ADSORBING - CONNECTING |
| BED4 | | | | COOLING - CLEANING | | | | | COOLING - CLEANING | | | COOLING - CONNECTING | STANDBY | PRESSURIZING | ADSORBING - CONNECTING |
| BED5 | HEATING - CONNECTING | COOLING - CONNECTING | | | | | | | COOLING - CLEANING | | | | | | |
| BED6 | | | HEATING - DISCHARGING | | | HEATING - CONNECTING | COOLING - CONNECTING | | | | COOLING - CLEANING | | | | |
| BED7 | | | | | | | HEATING - DISCHARGING | | | | HEATING - CONNECTING | COOLING - CONNECTING | COOLING - CLEANING | | |
| BED8 | HEATING - CONNECTING | | | | | | | | HEATING - DISCHARGING | | | | | | |

FIG. 6A

| Step | D | | | | | E | | | | | F | | | | |
|---|---|---|---|---|---|---|---|---|---|---|---|---|---|---|---|
| suE step | D1 | D2 | D3 | D4 | D5 | E1 | E2 | E3 | E4 | E5 | F1 | F2 | F3 | F4 | F5 |
| BED1 | HEATING - DISCHARGING | | | | | HEATING - CONNECTING | COOLING - CONNECTING | COOLING - CLEANING | | | | | | | |
| BED2 | HEATING - DISCHARGING | | | | | | | | | | HEATING - CONNECTING | COOLING - CONNECTING | COOLING - CLEANING | | |
| BED3 | HEATING - CONNECTING | | | | | HEATING - DISCHARGING | | | | | | | | | |
| BED4 | ADSORBING | | | | ADSORBING - CONNECTING | ADSORBING - CONNECTING | | | | | | | | | |
| BED5 | COOLING - CONNECTING | COOLING - CONNECTING | STANDBY | PRESSURIZING | | ADSORBING | | | | | | | | | |
| BED6 | COOLING - CLEANING | | | | | | COOLING - CONNECTING | STANDBY | PRESSURIZING | | ADSORBING | | | | ADSORBING - CONNECTING |
| BED7 | COOLING - CLEANING | | | | | | | | | | COOLING - CONNECTING | | STANDBY | PRESSURIZING | ADSORBING - CONNECTING |
| BED8 | HEATING - CONNECTING | COOLING - CONNECTING | | | | COOLING - CLEANING | | | | | | | | | |

FIG.6B

| Step | G | | | | | H | | | | |
|---|---|---|---|---|---|---|---|---|---|---|
| sub step | G1 | G2 | G3 | G4 | G5 | H1 | H2 | H3 | H4 | H5 |
| BED1 | COOLING - CLEANING | | | | | | COOLING - CONNECTING | STANDBY | PRESSURIZING | ADSORBING - CONNECTING |
| BED2 | | | | | | COOLING - CLEANING | | | | |
| BED3 | HEATING - CONNECTING | COOLING - CONNECTING | | | | COOLING - CLEANING | | | | |
| BED4 | | | | | | HEATING - CONNECTING | COOLING - CONNECTING | | | |
| BED5 | | | | | HEATING - DISCHARGING | HEATING - DISCHARGING | | | | |
| BED6 | HEATING - CONNECTING | | ADSORBING | | ADSORBING - CONNECTING | HEATING - DISCHARGING | | | | |
| BED7 | | | | PRESSURIZING | ADSORBING - CONNECTING | | | ADSORBING | | |
| BED8 | HEATING - CONNECTING | COOLING - CONNECTING | STANDBY | | | | | | | ADSORBING - CONNECTING |

METHOD FOR PREPARING HYDROGEN GAS

CROSS-REFERENCE TO RELATED APPLICATION

This application claims the benefit of priority to Korean Patent Application No. 10-2022-0029659, filed in the Korean Intellectual Property Office on Mar. 8, 2022, the entire contents of which are incorporated herein by reference.

TECHNICAL FIELD

The present disclosure relates to a method for preparing hydrogen gas, capable of regenerating an adsorbent by using exhaust gas, which is a by-product generated in dissolving ammonia, and representing excellent energy efficiency by using waste energy of the exhaust gas in heat exchange.

BACKGROUND

Recently, hydrogen gas has been spotlighted as an eco-friendly energy source. Accordingly, various manners for generating the hydrogen gas have been suggested. According to a manner for preparing hydrogen gas by decomposing ammonia in manners for preparing hydrogen gas, the hydrogen gas is generated in the mixture state with nitrogen gas and unreacted ammonia. Accordingly, the unreacted ammonia and the nitrogen gas needs to be removed to obtain higher-purity hydrogen. To remove the unreacted ammonia, for example, an adsorption system employing the adsorbent is employed. In this case, to consecutively remove the unreacted ammonia from the product, a process of regenerating the adsorbent in the adsorption system has to be performed together.

For example, International Publication No. WO2018/116982A (Patent Document 1) discloses a technology of decomposing ammonia and generating and refining hydrogen. Patent Document 1 discloses a manner for utilizing tail gas, which is generated in a PSA process, for a process of regenerating an ammonia adsorption system. In this case, for regeneration in an ammonia adsorption bed, a higher temperature of 800° C. or more and carrier gas are necessary. In Patent Document 1, higher-temperature PSA tail gas, which is generated as the higher-temperature gas generated from an ammonia decomposition reactor and the tail gas in the PSA process are heat-exchanged, is utilized for the regeneration process in the ammonia adsorption bed. However, the PSA tail gas has a composition of hydrogen and nitrogen, and there is a limitation in providing energy necessary for the regeneration process in the adsorption bed, due to a lower flow rate. Accordingly, to completely perform the regeneration process, an additional heat source is necessary.

In addition, Korean Patent Registration No. 2247199 (Patent document 2) discloses a method for preparing higher-purity hydrogen using ammonia, which includes 1) reducing the temperature of combined gas containing hydrogen, nitrogen, and unreacted ammonia using a cooler, and 2) adsorbing and refining the unreacted ammonia contained in the combined gas, which is cooled, by using an adsorption bed filled with an adsorbent. In this case, the adsorbing and the refining of the unreacted ammonia include regenerating of the adsorbent which is destroyed. In the regenerating of the adsorbent according to Patent Document 2, a temperature of the adsorbent is increased and maintained by using waste heat of combustion exhaust gas discharged from the reformer, and a tail gas including nitrogen and hydrogen generated in a PSA process is used as a carrier gas. In addition, according to Patent document 2, energy necessary for the regeneration process in an adsorption bed is supplied by utilizing the combustion exhaust gas having higher calorie, which is different from Patent document 1. However, according to Patent document 2, since the tail gas in the PSA process having the lower temperature is utilized as carrier gas without additional heat exchange, an injection part of carrier gas in the adsorption bed has the lower temperature, such that the regenerating process in the adsorption bed is not smoothly performed.

Accordingly, there are required studies and researches on a method for preparing hydrogen gas, capable of effectively regenerating an adsorbent in an adsorption bed without influence on the performance of the adsorbent while representing excellent system energy efficiency by utilizing the waste heat of the combustion exhaust gas and the PSA tail gas.

SUMMARY

The present disclosure has been made to solve the above-mentioned problems occurring in the related art while maintaining the advantages achieved by the related art.

An aspect of the present disclosure provides a method for preparing hydrogen gas, capable of effectively regenerating an adsorbent without influence on the performance of the adsorbent when regenerating the adsorbent, while representing excellent system energy efficiency by utilizing the waste heat of combustion exhaust gas and the PSA tail gas, thereby preventing the lifespan of the adsorbent from being reduced.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a method for preparing hydrogen gas, includes a decomposition step of decomposing ammonia-containing gas to produce decomposition-product gas, which contains nitrogen ($N_2$), hydrogen ($H_2$), and undecomposed ammonia, and exhaust gas, a first adsorption step of adsorbing and removing the undecomposed ammonia contained in the decomposition-product gas by a first adsorbent to produce first product gas containing nitrogen ($N_2$) and hydrogen ($H_2$), a second adsorption step of adsorbing and removing the nitrogen ($N_2$) contained in the first product gas by a second adsorbent to produce higher-purity hydrogen ($H_2$), a first regeneration step of regenerating the second adsorbent by desorbing the nitrogen ($N_2$) adsorbed to the second adsorbent while generating second off gas containing nitrogen ($N_2$) and hydrogen ($H_2$), a third heat-exchange step of heat-exchanging the exhaust gas transferred from the decomposition step and at least a portion of the second off gas transferred from the first regeneration step, and a second regeneration step of regenerating the first adsorbent after the first adsorption step by transferring, to the first adsorbent, the exhaust gas and the at least a portion of the second off gas, which are heat-exchanged in the third heat-exchange step and serve as heating-desorbing gas, and a remainder of the second off gas, which is transferred from the first regeneration step and serves as cooling-cleaning gas.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, the details of the present disclosure will be described.

According to the present disclosure, a method for preparing hydrogen gas includes a decomposition step, a first adsorption step, a second adsorption step, a first regeneration step, a third heat-exchange step, and a second regeneration step.

Decomposition Step

The present step is to produce decomposition-product gas including nitrogen ($N_2$), hydrogen ($H_2$), and an undecomposed ammonia and exhaust gas by decomposing ammonia-containing gas.

Various methods for generating the decomposition-product gas by decomposing the ammonia-containing gas may be employed, as long as the methods for generating the decomposition-product gas are applied to the process of preparing the hydrogen gas by decomposing the ammonia-containing gas. For example, as a reactor having ammonia decomposing catalysts stacked on each other and a heat source supply to heat the reactor are provided, the ammonia-containing gas is subject to catalyst decomposing reaction in the reactor, thereby generating the decomposition-product gas. In this case, the exhaust gas is generated as a by-product.

The internal temperature of the reactor having the stacked ammonia decomposing catalysts may be in the range of 500 to 900° C., or the range of 650 or 800° C.

In addition, various ammonia decomposing catalysts may be employed, as long as the ammonia decomposing catalysts are available for decomposing ammonia. For example, the ammonia decomposing catalyst may include at least one element selected from the group consisting of Ni, Pt, Pd, La, and Ru. Specifically, the ammonia decomposing catalyst may be supported catalyst include at least one metal including the element, wherein a support include a metal oxide, wherein the metal include at least one selected from the group of consisting of Ce, $Al_2O_3$, Si, La, Ti, Mg, and Zr.

The decomposition-product gas discharged in the decomposition step includes $N_2$, $H_2$, and undecomposed ammonia. In addition, the decomposition-product gas transferred in the decomposition step may have the internal temperature in the range of 500 to 800° C., or the range of 650 to 750° C.

Alternatively, the exhaust gas discharged in the decomposition step may have the internal temperature in the range of 500 to 800° C., or the range of 600 to 750° C.

The decomposition reaction of the ammonia-containing gas is an endothermic reaction, and the internal temperature of the reactor is preferably maintained to be in the range of 500 to 800° C. A heat source supply to supply energy necessary for maintaining the internal temperature of the reactor may include, for example, an electric heater or a gas burner. The gas burner may use, as fuel gas, liquid natural gas (LNG), liquid petroleum gas (LPG), ammonia, hydrogen, or the mixed gas of ammonia and hydrogen. In addition, the heat source supply is positioned inside the reactor to employ a manner of directly heating the reactor or is positioned outside the reactor to employ an indirect heating manner of utilizing higher-temperature exhaust gas generated from the heat source supply.

The exhaust gas discharged in the decomposition step may be exhaust gas discharged from the heat source supply. Alternatively, the exhaust gas discharged in the decomposition step may be varied depending on the type of fuel gas, and may include, typically, at least one selected from the group consisting of $N_2$, nitrogen oxide (NOx), carbon dioxide ($CO_2$), oxygen ($O_2$), and water ($H_2O$). In addition, the exhaust gas is discharged through the decomposition step for the ammonia, and the temperature of the exhaust gas may be in the range of 500 to 800° C., or 600 to 750° C.

In addition, since the decomposition-product gas transferred from the decomposition step to the first adsorption step has the higher temperature of 500° C. or more as described above, the decomposition-product gas may be cooled before being introduced into the first adsorption step to increase adsorption efficiency of the undecomposed ammonia which is contained in the decomposition-product gas. To this end, the preparing method according to the present disclosure may further include a first heat-exchange step in which ammonia in a liquid phase is heat-exchanged with the decomposition-product gas transferred from the decomposition step to the first adsorption step.

First Heat-Exchange Step

In the present step, as the decomposition-product gas transferred from the decomposition step to the first adsorption step is heat-exchanged with the liquid-phase ammonia, the temperature of the decomposition-product gas is decreased, and the liquid-phase ammonia may be vaporized. As described above, as the thermal energy of the higher-temperature decomposition-product gas is supplied as a heat source of latent heat for vaporizing the liquid-phase ammonia, due to the first heat-exchange step. Accordingly, the hydrogen gas preparing method according to the present disclosure may improve the thermal energy efficiency.

In this case, various heat exchangers may be employed in the first heat-exchange step, as long as the heat exchangers are typical heat exchangers. For example, the heat exchanger may include a well-known heat exchanger, for example, in a cylindrical multi-tube type, a double-tube type, a flat plate type, or a coil-type.

In addition, the decomposition-product gas heat-exchanged in the first heat-exchange step may have the temperature in the range of 30 to 150° C., or the range of 50 to 80° C. When the temperature of the decomposition-product gas is within the above range, the decomposition-product gas having the temperature is appropriate to the process in the first adsorption step. In addition, since the waste heat from the decomposition-product gas is used as a heat source for vaporizing the ammonia serving as a source material, the whole energy efficiency of the system may be improved.

In this case, a cooling device to additionally decrease the temperature of the decomposition-product gas may be further included.

Since the exhaust gas discharged in the decomposition step has the higher temperature of 500° C. or more as described above, the waste heat of the exhaust gas may be used to increase the temperature of ammonia which serves as a source material introduced into the decomposition step. To this end, the preparing method according to the present disclosure may additionally include a second heat-exchange step in which the exhaust gas transferred from the decomposition step is heat-exchanged with ammonia heat-exchanged in the first heat-exchange step.

Second Heat-Exchange Step

The exhaust gas transferred from the decomposition step has the higher temperature of 500° C. or more as described above, and the ammonia vaporized by heat exchange in the first heat-exchange step has the lower temperature of 400° C. or less. Accordingly, the exhaust gas having the higher temperature and the ammonia having the lower temperature are heat-exchanged together, thereby increasing the temperature of the ammonia to about the decomposition reaction temperature before the ammonia is introduced in the decomposition step.

Due to the second heat-exchange step as described above, the lower-temperature ammonia is increased to about the decomposition reaction temperature through the waste heat of the exhaust gas, thereby improving the decomposition reaction efficiency of ammonia.

In this case, various heat exchangers may be employed in the second heat-exchange step, as long as the heat exchangers are typical heat exchangers. For example, the heat exchanger may include a well-known heat exchanger, for example, in a cylindrical multi-tube type, a double-tube type, a flat plate type, or a coil-type.

First Adsorption Step

In the present step, the undecomposed ammonia in the decomposition-product gas is adsorbed and removed by the first adsorbent to produce first product gas containing nitrogen ($N_2$) and hydrogen ($H_2$).

The first adsorption step may be performed through a thermal swing adsorption (TSA) manner. Specifically, in the first adsorption step, the undecomposed ammonia contained in the decomposition-product gas may be selectively adsorbed and removed by the first adsorbent through the thermal swing adsorption (TSA) manner.

The first adsorbent may include at least one of a carbon-based material and a zeolite-based material. The carbon-based material may be, for example, an activated carbon-based material, and the zeolite-based material may be zeolite or pseudo-zeolite. Specifically, the first adsorbent may have at least one chemical composition selected from the group consisting of activated carbon, aluminosilicate, pure silicate, titanosilicate, and aluminophosphate.

In addition, the first adsorbent may be filled in a plurality of adsorption beds. Specifically, the number of a plurality of adsorption beds filled with the first adsorbent may be 2n+2 (wherein, "n" is a natural number). In this case, "n" may be in the range of 1 to 3. That is, the number of adsorption beds filled with the first adsorbent may be an even number. It is preferred that the number of adsorption beds filled with the first adsorbent is the even number for the continuous flow of exhaust gas and second off gas in the first adsorption step and regeneration step.

The first adsorption step may be performed at a temperature in the range of 10 to 80° C. or the range of 25 to 50° C., and a pressure in the range of 1 to 20 bar or the range of 5 to 10 bar.

According to an embodiment of the present disclosure, on the assumption that an amount of hydrogen generated was 300 Nm³/hr, and the recovery rate in the second adsorption step was 85%, the preparing method of the present disclosure was performed by adjusting the number of adsorption beds in the first adsorption step to 4, 6, 8 or 10.

As described above, it may be recognized from the result of the embodiment that as the number of adsorption beds filled with the first adsorbent is increased, the time for adsorption is decreased, thereby decreasing an amount of adsorbents for one adsorption bed, such that the whole volume of the adsorption bed is reduced. However, the whole volume of the adsorption bed was gently decreased at eight adsorption beds or more, and the difference in specification between eight adsorption beds and 10 adsorption beds was hardly made. Meanwhile, as the number of adsorption beds is increased, necessary utilities are increased, which is disadvantageous in terms of costs (capital expenditure; CAPEX). Accordingly, when the number of adsorption beds is 10, it is expected that the effect of a yield for costs is reduced, such that an additional economical effect is not sufficiently obtained. In addition, when the number of adsorption beds is 10, the adsorption bed has a diameter smaller than a height. Accordingly, when adsorbents having a smaller particle diameter are used, pressure may be dropped. In this regard, it is preferred that the number of the plurality of adsorption beds is 2n+2. In this case, it is preferred that 'n' is a natural number in the range of 1 to 3.

Second Adsorption Step

In the present step, nitrogen ($N_2$) contained in the first product gas is adsorbed and removed by a second adsorbent to generate second off gas including higher-purity hydrogen ($H_2$), hydrogen ($H_2$), and nitrogen ($N_2$).

The second adsorption step may be performed through a pressure swing adsorption (PSA) manner. For example, in the second adsorption step, nitrogen ($N_2$) contained in the first product gas is adsorbed and removed by the second adsorbent through the PSA manner to generate higher-purity hydrogen ($H_2$).

Various second adsorbents may be used, as long as the second adsorbents are typically used to adsorb nitrogen gas. For example, the second adsorbent may include zeolite-based material. The zeolite-based material may be zeolite or pseudo-zeolite. Specifically, the second adsorbent may have at least one chemical composition selected from the group consisting of activated carbon, aluminosilicate, pure silicate, titanosilicate, and aluminophosphate.

In addition, the second adsorbent may be regenerated by desorbing nitrogen adsorbed to the second adsorbent after the second adsorption step. In this case, various manners for regenerating the second adsorbent may be employed, as long as the manners for regenerating the second adsorbent are applicable to regenerating the adsorbent in a conventional process of adsorbing nitrogen gas. For example, the nitrogen adsorbed to the second adsorbent may be desorbed by decreasing the internal pressure of the adsorption bed filled with the second adsorbent.

The adsorbing and removing in the second adsorption step may be performed at a temperature in the range of 10 to 50° C. or the range of 20 to 30° C., and a pressure in the range of −1 to 15 bar or 0 to 10 bar.

The hydrogen generated in the present step is a final product and has high purity of 99% or more, or 99.9% or more. Accordingly, the hydrogen is applicable to various fields, such as a hydrogen charging station, hydrogen fuel cell power generation, and a gas source of a chemical process without additional purification.

First Regeneration Step

In the present step, nitrogen adsorbed to the second adsorbent is desorbed to regenerate the second adsorbent while generating the second off gas containing nitrogen ($N_2$) and hydrogen ($H_2$).

Further, in the present step, various desorbing manners may be used, as long as the desorbing manners are used to desorb the nitrogen adsorbed to the adsorbent.

The second off gas may include nitrogen gas ($N_2$) and hydrogen gas ($H_2$). In this case, the second off gas discharged in the present step may have the temperature in the range of 10 to 50° C. or the range of 20 to 30° C.

Third Heat-Exchange Step

In the present step, the exhaust gas transferred from the decomposition step is heat-exchanged with at least a portion of the second off gas transferred from the first regeneration step.

The exhaust gas transferred from the decomposition step has a high temperature of 500° C. or more, and the second off gas transferred from the first regeneration step has a lower temperature of 50° C. or lower as described above. Accordingly, as the exhaust gas having the higher temperature is heat-exchanged with the second off gas having the lower temperature, the temperature of the exhaust gas is decreased, and the temperature of the second off gas is increased. Accordingly, each of the second off gas and the exhaust gas, which are heat-exchanged together in the present step, may be used as gas for regenerating the adsorbent.

As the thermal energy of the higher-temperature exhaust gas is supplied as a heat source for increasing the temperature of the second off gas due to the third heat-exchange step as described above, the ammonia adsorbed to the first adsorbent may be effectively removed.

In this case, various heat exchangers may be used in the third heat-exchange step, as long as the heat exchangers are typical heat exchangers. For example, the heat exchangers may include well-known heat exchangers, for example, in a cylindrical multi-tube type, a double-tube type, a flat plate type, or a coil-type.

The second off gas heat-exchanged in the third heat-exchange step may have the temperature in the range of 400° C. or more and less than 600° C., or the range of 450 to 550° C. When the temperature of the second off gas is within the above range, the temperature of the second off gas is appropriate, such that the second off gas serves as the heating-desorbing gas for regenerating the first adsorbent, thereby improving regeneration efficiency of the first adsorbent.

When the second off gas transferred from the second adsorption step is introduced into the second regeneration step without heat exchange, as the temperature of the second off gas is lowered to be in the range of 20 to 50° C., the temperature of the second off gas, which is introduced in the initial stage, is lowered. Accordingly, the regeneration efficiency of the first adsorbent is lowered. Accordingly, only when the heating-desorbing gas for regenerating the first adsorbent has the higher temperature of 350° C., the ammonia adsorbed to the first adsorbent may be effectively desorbed.

In addition, the remaining second off gas that has not been heat-exchanged in the third heat-exchange step may be used as cooling-cleaning gas for lowering the temperature of the first adsorbent after heating-desorption.

The exhaust gas heat-exchanged in the third heat-exchange step may have the temperature in the range of 500° C. or more and less than 650° C., or the range of 500 to 600° C. When the temperature of the exhaust gas heat-exchanged in the heat-exchange step is within the above range, the temperature of the exhaust gas is appropriate, such that the exhaust gas serves as the heating-desorbing gas for regenerating the first adsorbent, thereby improving regeneration efficiency of the first adsorbent.

In this case, the second off gas heat-exchanged in the present step may be in the range of 10 to 40 volume %, or 15 to 30 volume %, of the total volume of the second off gas transferred from the first regeneration step. When the volume ratio of the second off gas heat-exchanged in present step is less than the above range, the effect of removing ammonia adsorbed to the first adsorbent may be lowered. When the volume ratio of the second off gas exceeds the above range, an amount of second off gas used for cooling and cleaning may be decreased. Accordingly, the time taken to cool the first adsorbent in the adsorption beds may be prolonged.

Second Regeneration Step

The adsorption bed, which has been completely used in the adsorption step, is necessary to be subject to a recycling step, such that the adsorption bed is regenerated. Accordingly, the preparing method of the present disclosure includes a second recycling step Specifically, in the present step, the at least a portion of the second off gas, which is heat-exchanged in the third heat-exchange step, and the remaining second off gas are transferred to the first adsorbent side to regenerate the first adsorbent. The at least a portion of the second off gas, which is heat-exchanged in the third heat-exchange step, is the heating-desorbing gas, and the remaining second off gas (that is, the second off gas not heat-exchanged) transferred from the first regeneration step may serve as the cooling-cleaning gas.

As described above, the at least a portion of the second off-gas heat exchanged in the third heat-exchange step may have a temperature in the range of 400° C. or more and less than 600° C. or the range of 450 to 550° C., and the second off gas not heat-exchanged may have the temperature in the range of 20 to 50° C.

The heating-desorbing gas serves to desorb ammonia adsorbed to the first adsorbent and to discharge the desorbed ammonia. The second off gas heat-exchanged in the third heat-exchange step does not affect the performance of the first adsorbent, even when directly making contact with the first adsorbent, and may effectively desorb the ammonia adsorbed to the first adsorbent by increasing the temperature of the first adsorbent. Specifically, the at least a portion of the second off gas heat-exchanged in the third heat-exchange step may pass an adsorption bed while directly making contact with the first adsorbent. Therefore, the heat-exchanged second off gas may effectively desorb the ammonia adsorbed to the first adsorbent and discharge the desorbed ammonia by increasing the temperature of the first adsorbent.

In addition, the present step may further include additionally heat-exchanging the exhaust gas heat-exchanged in the third heat-exchange step with the first adsorbent to increase the ambient temperature of the first adsorbent.

In this case, when the exhaust gas including oxygen ($O_2$) and water ($H_2O$) directly makes contact with an adsorbent, the performance of the adsorbent may be degraded. Therefore, in the present step, it is preferred that the exhaust gas heat-exchanged in the third heat-exchange step does not directly make contact with the first adsorbent to prevent the performance of the first adsorbent from being degraded and to regenerate the first adsorbent. Specifically, the exhaust gas heat-exchanged in the third heat-exchange step may be heat-exchanged with the first adsorbent without directly making contact with the first adsorbent. Accordingly, the exhaust gas heat-exchanged in the third heat-exchange step exchanges heat with the first adsorbent to increase the temperature of the first adsorbent and the ambient temperature of the first adsorbent, thereby effectively desorbing the ammonia adsorbed on the first adsorbent. Accordingly, the exhaust gas heat-exchanged in the third heat-exchange step may serve as gas for increasing the temperature of the first adsorbent.

For example, when the first adsorbent is an activated carbon-based material, the adsorption force between the first adsorbent and ammonia are weak. Accordingly, the first adsorbent may be regenerated only by using the second off gas heated exchanged in the third heat-exchange step. In detail, when the first adsorbent is the activated carbon-based material, the adsorption bed filled with the first adsorbent may be in a monotube type. When the adsorption bed is in the monotube type, the second off gas, which is heat-exchanged in the third heat-exchange step, is transferred to the first adsorbent while serving as the heating-desorbing gas in the second generation step, the ammonia adsorbed to the first adsorbent is desorbed and discharged to be regenerated.

Figure 1:
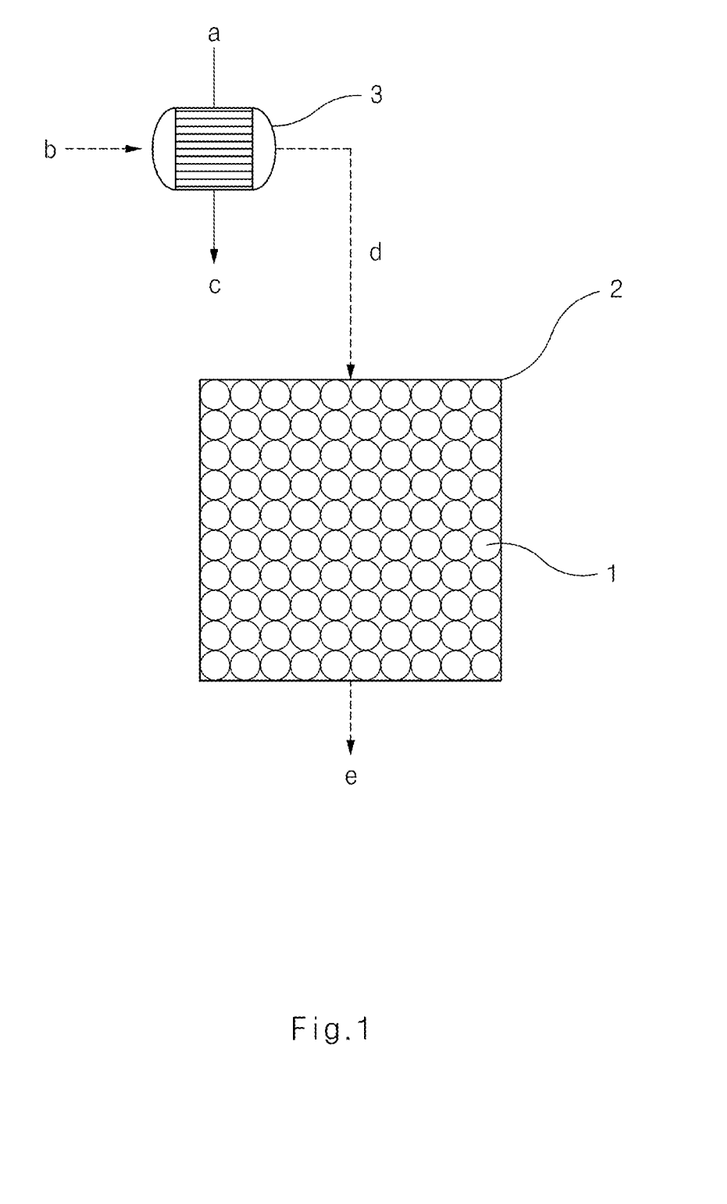
FIGS. 1 to 3 are schematic views illustrating an adsorption bed in a regeneration step and an air flow, in a first adsorption step, according to an embodiment of the present disclosure.

Referring to FIG. 1, an adsorption bed 2, which is in a monotube type, is filled with a first adsorbent 1, exhaust gas a transferred from the decomposition step is heat-exchanged with at least a portion b of the second off gas transferred from the first regeneration step in a third heat exchanger 3. Second off gas d which is heat-exchanged may be transferred to the first adsorbent 1 to desorb and discharge the ammonia adsorbed to the first adsorbent 1. In this case, first off gas e discharged from the second regeneration step may include $N_2$, $H_2$, and ammonia.

In the second regeneration step, the first off gas including undecomposed ammonia, which is adsorbed to the first adsorbent and serves as a by-product, $N_2$, and $H_2$, may be generated, and may be re-circulated to the decomposition step.

For example, the first off gas e is re-circulated to be introduced into the decomposition step. In detail, the first off gas e may be introduced into a heat source supply in the decomposition step. As described above, when the first off gas is used as a source material of the heat source supply, at least a portion or an entire portion of the source material gas introduced into the heat source supply may be substituted for the first off gas. Accordingly, the operating expenses (OPEX) of the preparing method may be reduced.

For example, when the first adsorbent is a zeolite-based material, the adsorption force between the first adsorbent and ammonia are strong. Accordingly, the first adsorbent may not be regenerated only by using the second off gas heat-exchanged in the third heat-exchange step. Accordingly, when the first adsorbent is a zeolite-based material, the second off gas heat-exchanged in the third regeneration step and the exhaust gas heat-exchanged in the third heat-exchange step are used in the second regeneration step, and the adsorption bed filled with the first adsorbent may have a double tube type and a multi-tube type. Specifically, the first adsorbent may be filled in a shell of an adsorption bed, and an exhaust gas flow path may be formed in a tube of the adsorption bed. Alternatively, the first adsorbent may be filled in a tube of an adsorption bed, and an exhaust gas flow path may be formed in a shell of the adsorption bed. In this case, the second off gas heat-exchanged in the third heat-exchange step may pass through the shell or tube of the adsorption bed filled with the first adsorbent, and the exhaust gas heat-exchanged in the third heat-exchange step may pass through the exhaust gas flow path.

Figure 2:
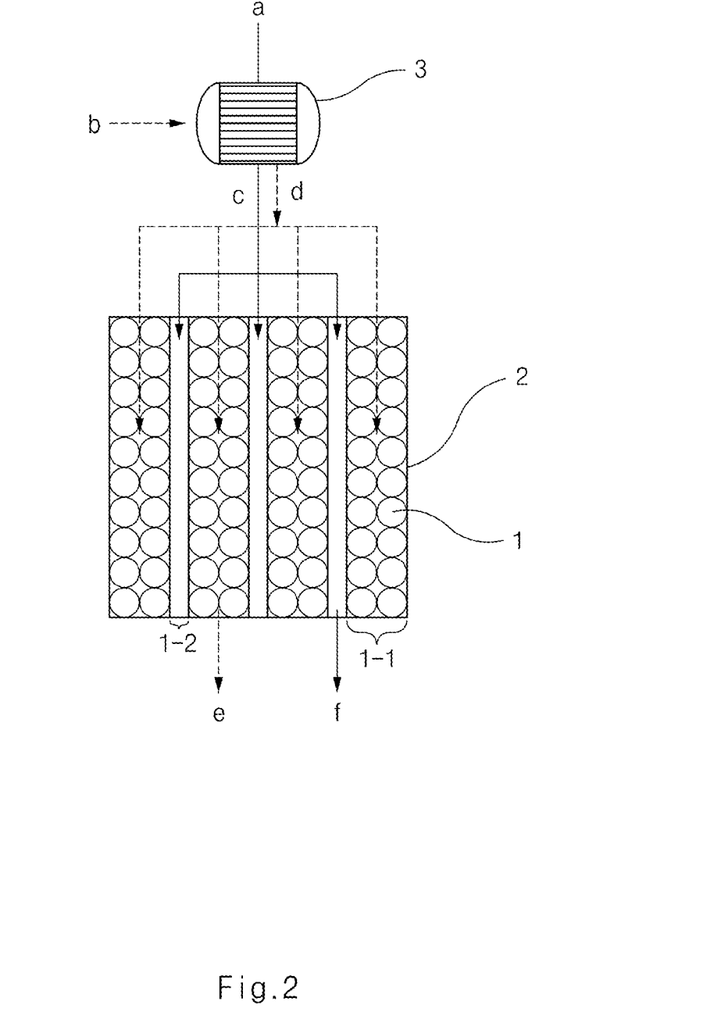

Referring to FIG. 2, the first adsorption bed 2, in which the first adsorption step is performed, may include a shell 1-1 filled with a first adsorbent 1 and an exhaust gas flow path 1-2. The first adsorption bed 2 having the structure may constitute an adsorption system in which a plurality of adsorption beds are connected in parallel. In addition, the exhaust gas a transferred from the decomposition step and at least a portion b of the second off gas transferred from the first regeneration step may be heat-exchanged together in the third heat exchanger 3. In addition, the second off gas d, which is heat-exchanged, may pass through the shell 1-1 of the adsorption bed to desorb and discharge ammonia adsorbed to the first adsorbent 1. Exhaust gas c heat-exchanged may pass through the exhaust gas flow path 1-2 to increase and maintain the temperature of the first adsorption bed 2 without directly making contact with the first adsorbent 1. In this case, the first off gas e discharged from the shell 1-1 of the adsorption bed in the second regeneration step may include $N_2$, $H_2$, and ammonia. Second discharge gas f discharged from the exhaust gas flow path 1-2 may include exhaust gas. Each of the first off gas e and the second discharge gas f may be in the range of 300 to 500° C. or the range of 350 to 450° C.

Figure 3:
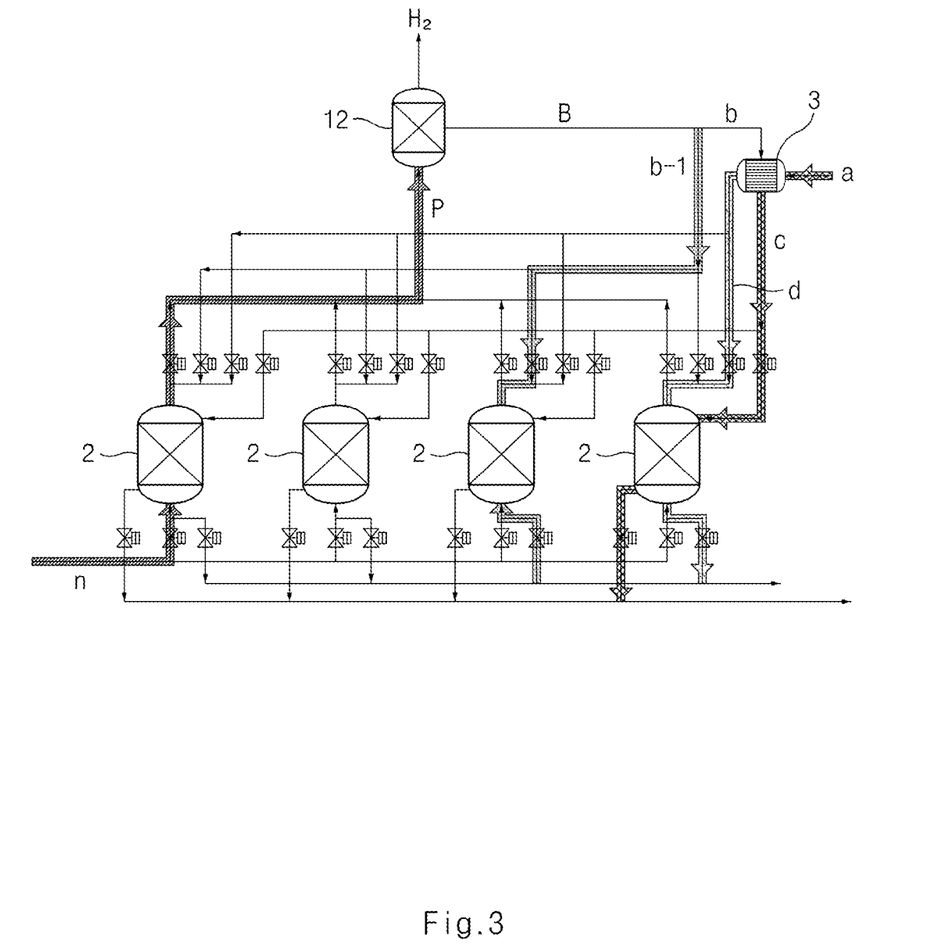

In some embodiments, the method may further include repeating a cycle in each of the plurality of adsorption beds in the first adsorption step and the second regeneration step independently. Referring to FIG. 3, each of a plurality of adsorption beds in the first adsorption step and the second regeneration step may independently repeat a cycle sequentially including A-1 an adsorbing process of adsorbing the undecomposed ammonia to the first adsorbent while supplying the decomposition-product gas n transferred from the decomposition step to the adsorption bed 2, B-1 a heating-desorbing process (e.g., a desorbing process) of desorbing the adsorbed ammonia by allowing at least a portion of the second off gas d, which is heat-exchanged in the third heat-exchange step 3, to pass through the adsorption bed in which the adsorbing process has been finished, and C-1 a cooling-cleaning process (e.g., a cleaning process) for the first adsorbent by allowing remaining second off gas b-1 transferred from a second adsorber 12 to pass through the adsorption bed in which the heating-desorbing process has been finished.

In detail, 2n+2 of adsorption beds are provided (in this case, "n" is a natural number", and the plurality of adsorption beds alternately and independently perform the adsorbing process A-1, the heating-desorbing process B-1, and the cooling-cleaning process C-1, such that the adsorbing and desorbing of the undecomposed ammonia and the cleaning of the adsorbent may be consecutively performed.

In this case, in process C-1, as the remaining second off gas b-1 transferred from the second adsorber 12 may directly make contact with the first adsorbent while being allowed to pass through the adsorption bed, the first adsorbent heated in the heating-desorbing process B-1 may be cooled and cleaned. The second off gas B transferred from the second adsorption step may have the temperature in the range of 20 to 50° C. or the range of 25 of 40° C.

For example, four, six, or eight adsorption beds may be provided.

Figure 4A:
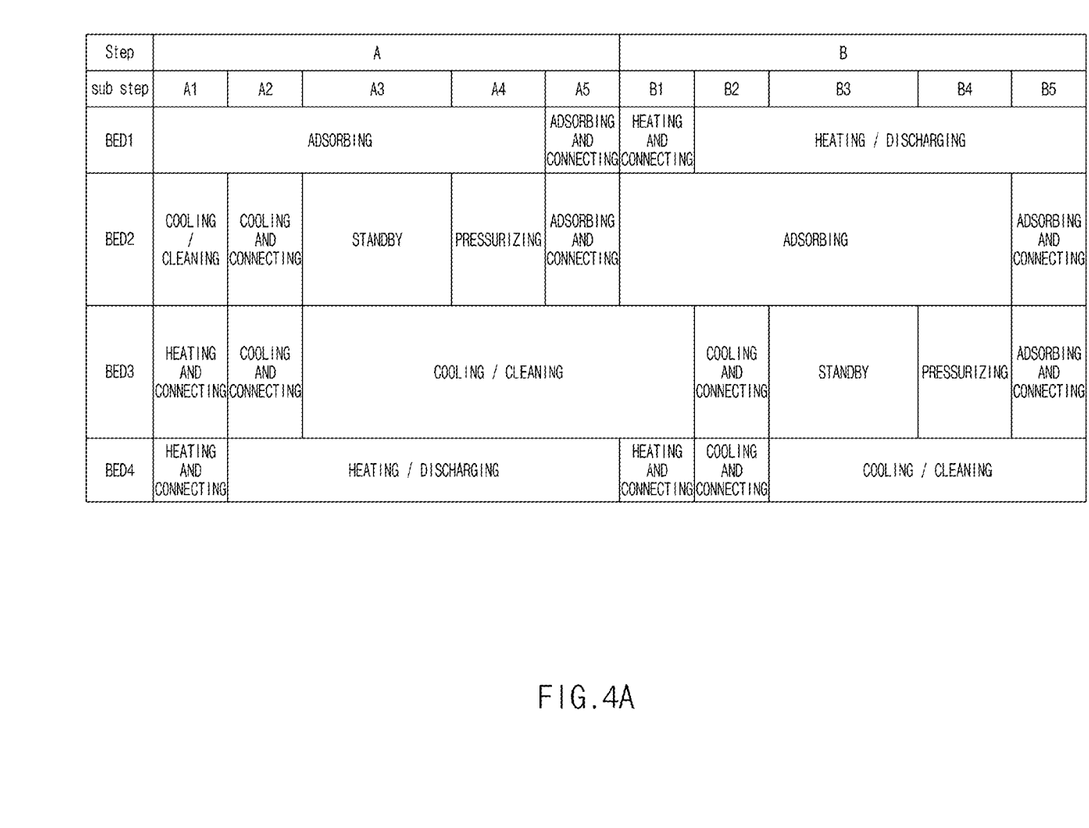
FIGS. 4A, 4B, 5A, 5B, and 6A to 6C illustrate process logic in a first adsorption step and a regeneration step, according to an embodiment of the present disclosure.
Figure 4B:
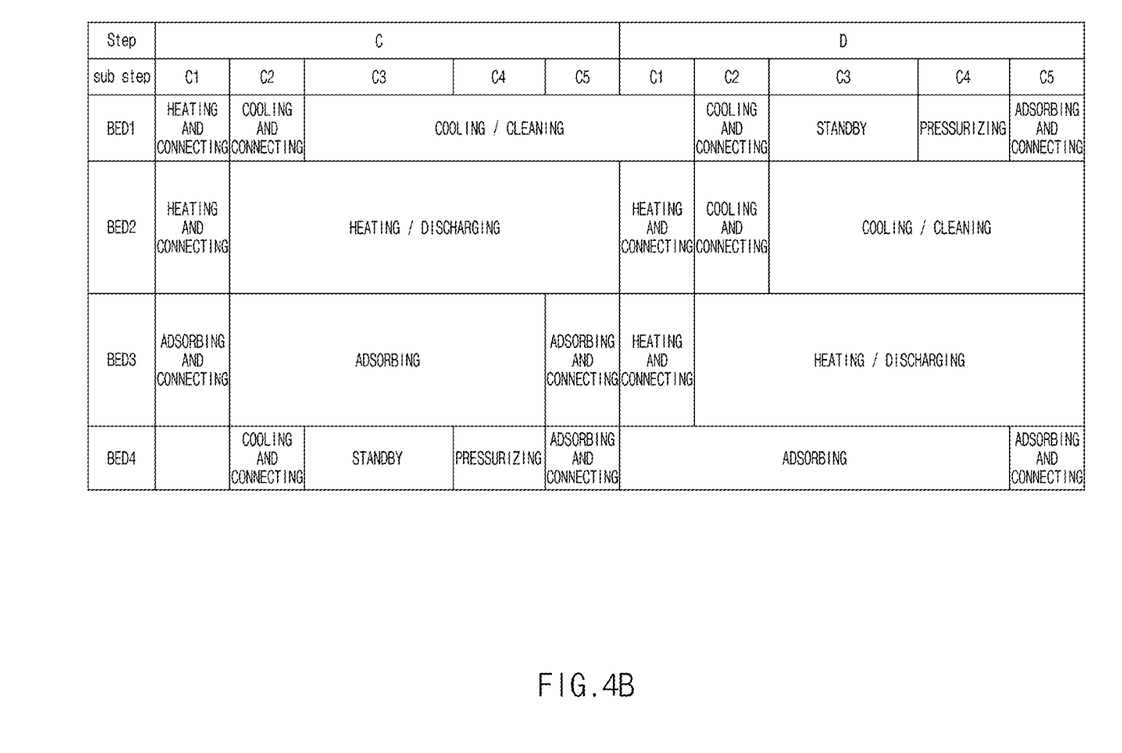

Referring to FIG. 4, four adsorption beds 2 are provided, and may independently repeat a cycle in which the adsorbing process A-1, the heating-desorbing process B-1, and the cooling-cleaning process C-1 are sequentially provided.

Figure 5A:
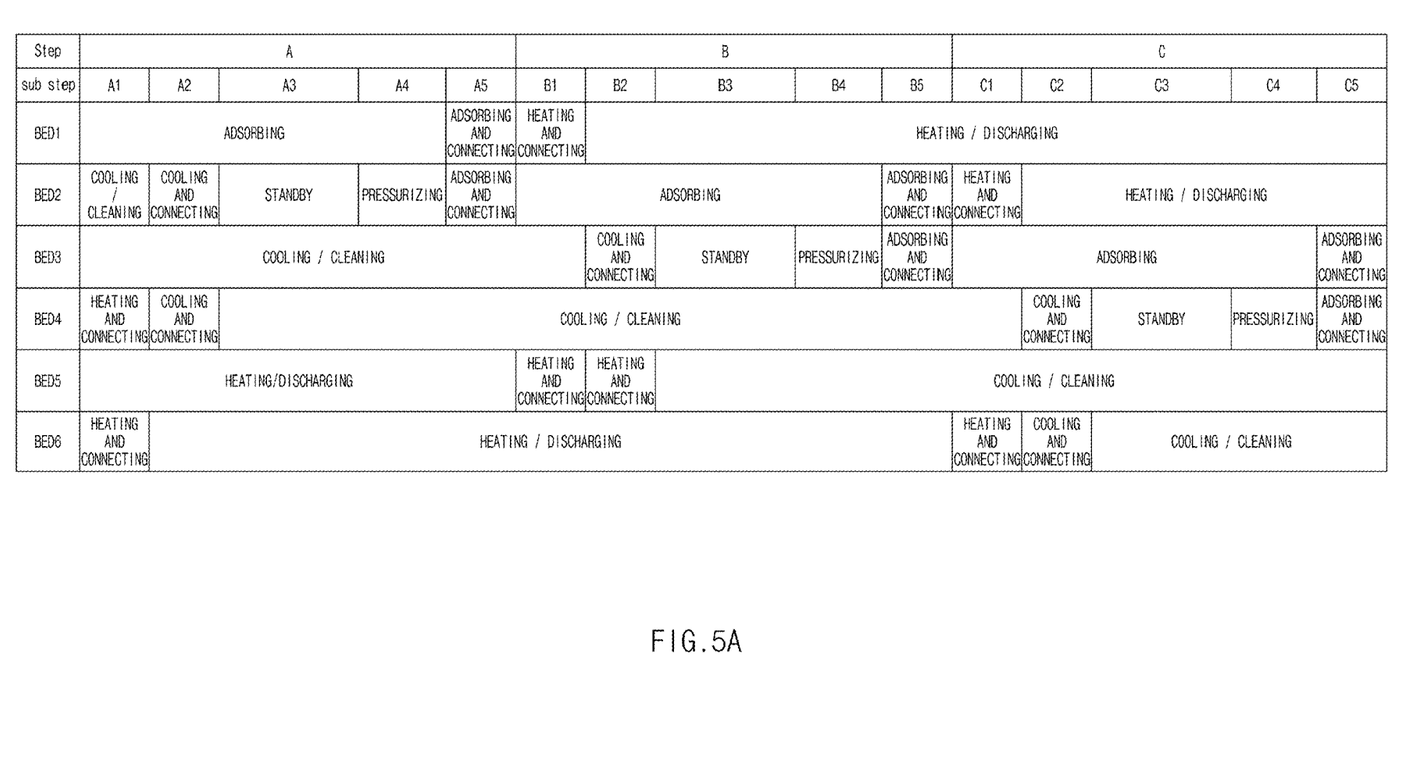
Figure 5B:
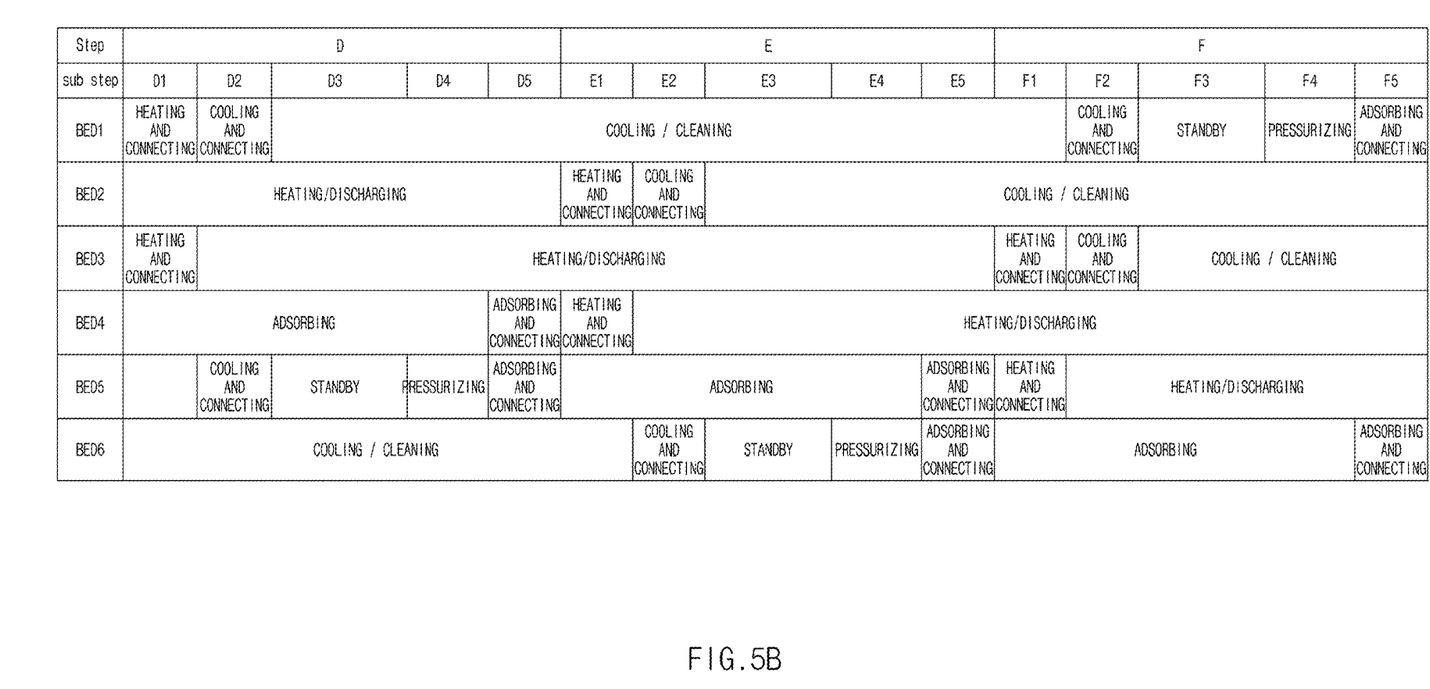

Referring to FIG. 5, six adsorption beds 2 are provided, and may independently repeat a cycle in which the adsorbing process A-1, the heating-desorbing process B-1, and the cooling-cleaning process C-1 are sequentially provided.

Figure 6A:
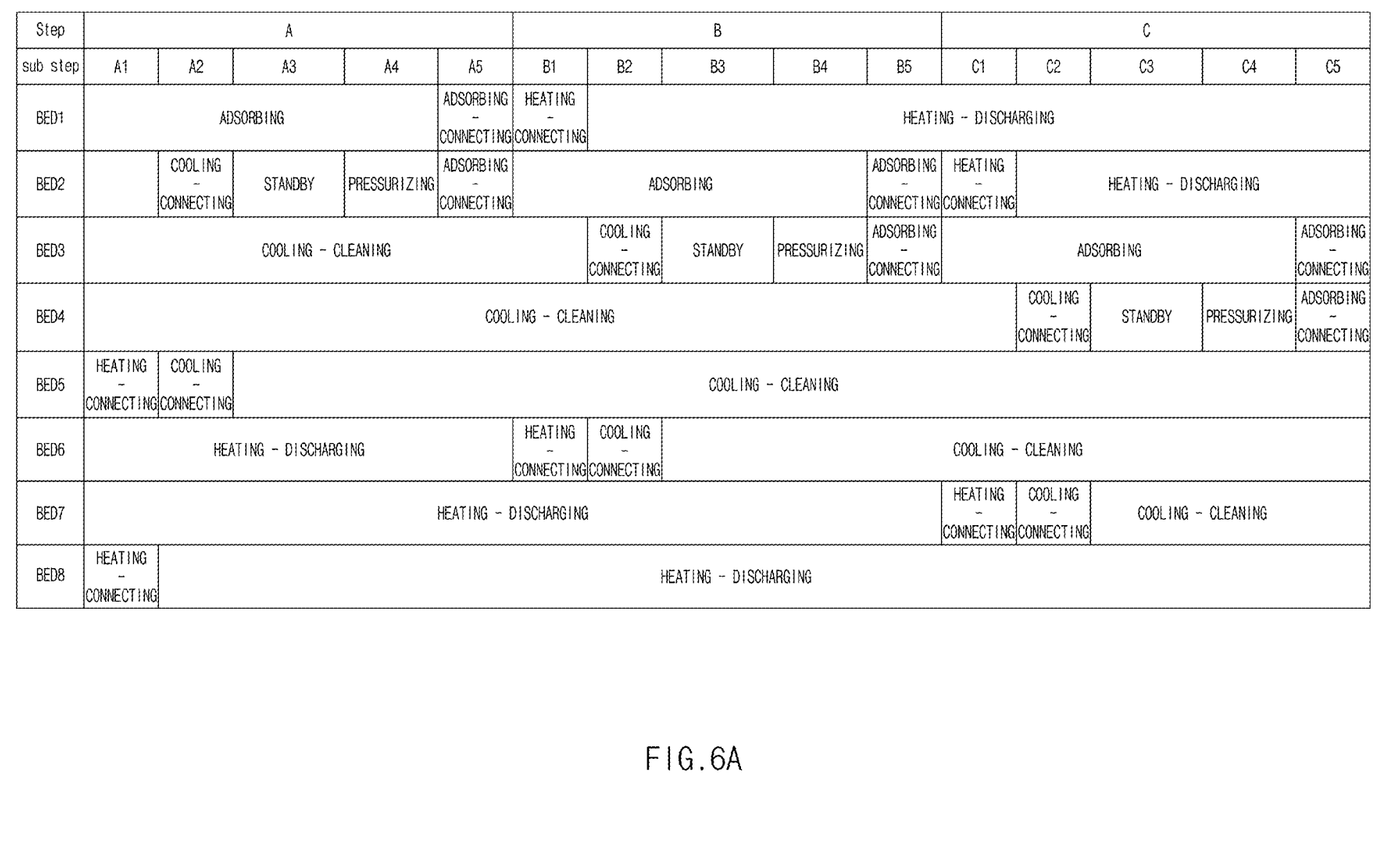
Figure 6B:
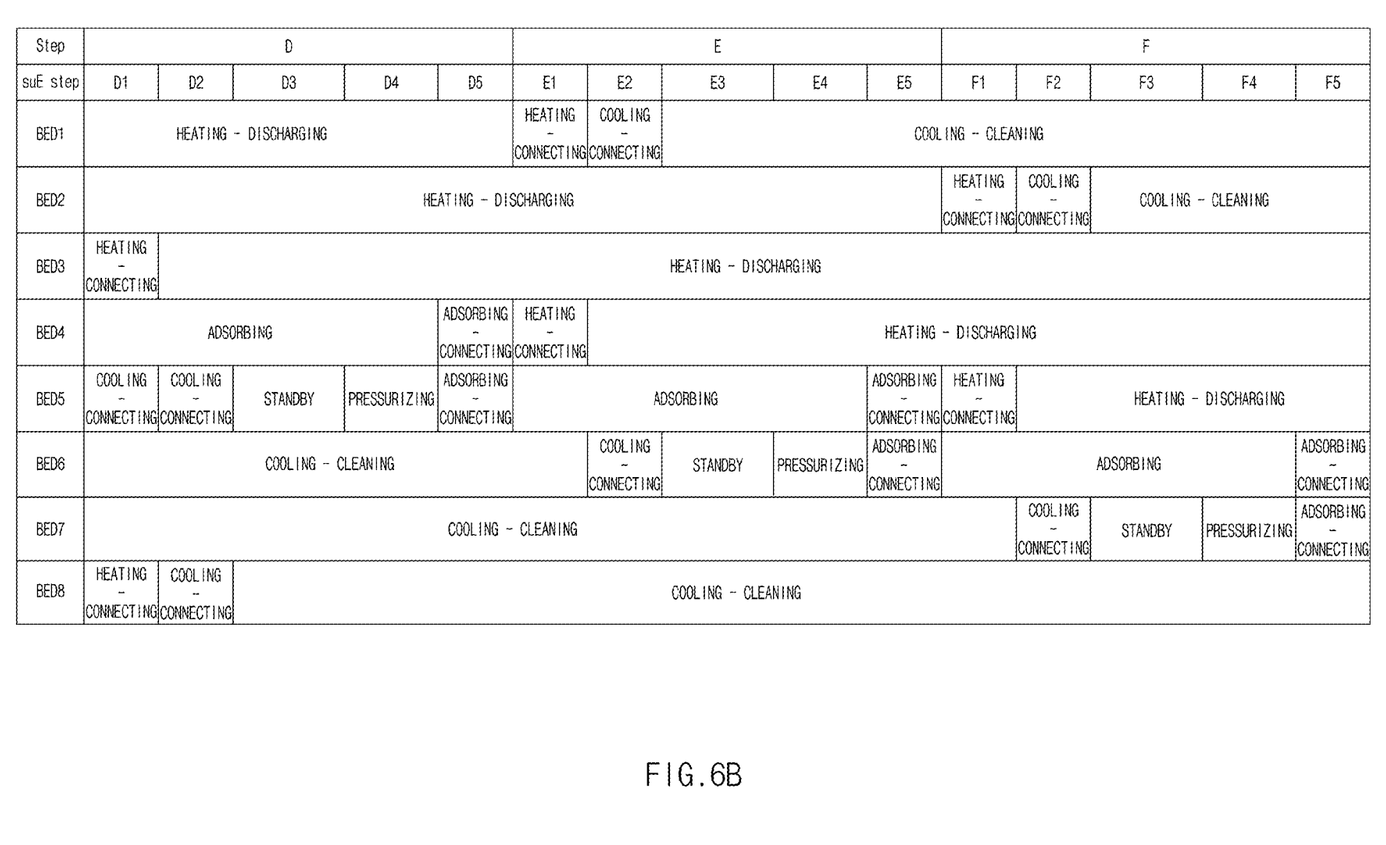
Figure 6C:
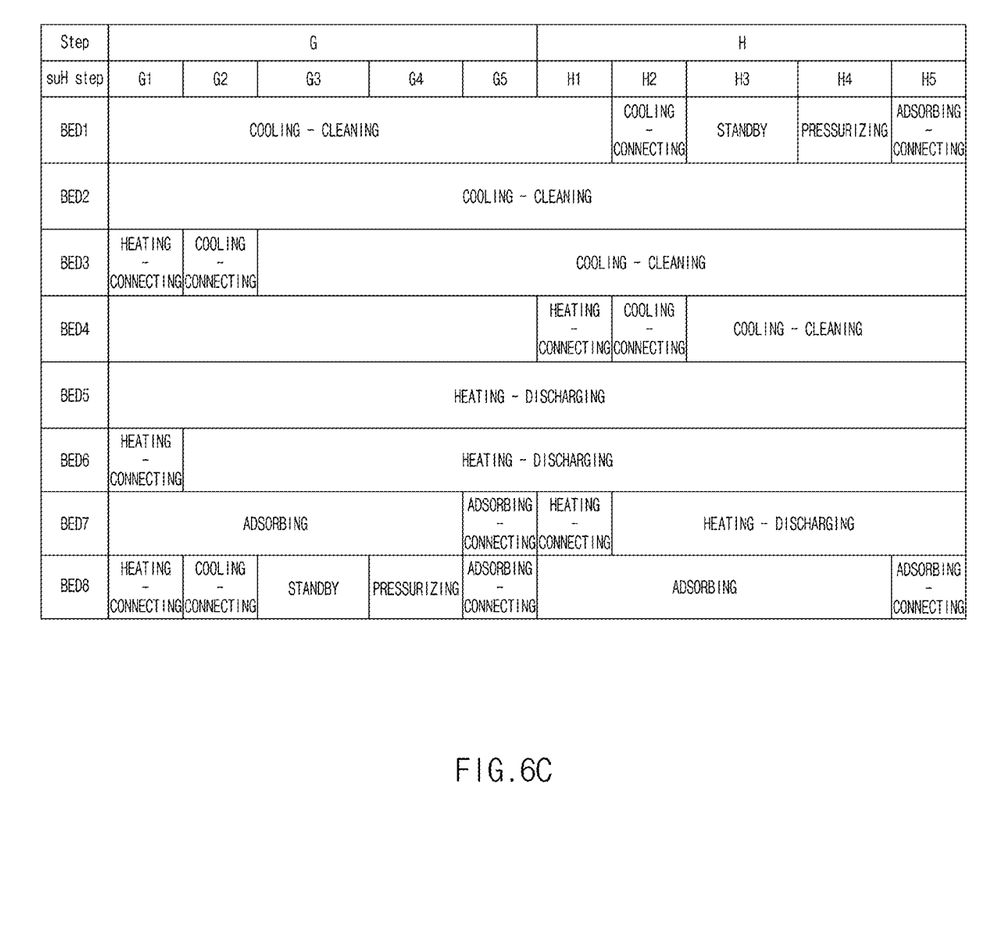

Referring to FIG. 6, eight adsorption beds 2 are provided, and may independently repeat a cycle in which the adsorbing process A-1, the heating-desorbing process B-1, and the cooling-cleaning process C-1 are sequentially provided.

The heating-desorbing process may be performed at a temperature in the range of 250 to 500° C. or the range of 350 to 450° C., and at atmospheric pressure. In this case, the energy necessary to increase the temperature of the adsorption bed may be based on waste heat of the exhaust gas transferred from the third heat-exchange step. The exhaust gas includes water vapor ($H_2O$), and nitrogen oxide (NOx). Accordingly, when the exhaust gas directly makes contact with the first adsorbent, the activity of the first adsorbent may be degraded. Accordingly, it is preferred that a heat exchange manner is used without the direct contact with the first adsorbent.

In addition, carrier gas may be used to smoothly remove ammonia adsorbed to the first adsorbent in the second regeneration step. In this case, at least a portion of the second off gas transferred in the second adsorption step may be used as the carrier gas. The second off gas may be used, after the temperature of the second off gas is increased in the third heat-exchange step. In addition, the remaining second off gas that has not been heat-exchanged in the third heat-exchange step may be used as cooling-cleaning gas.

According to an embodiment of the present disclosure, referring to FIG. 7, the method for preparing hydrogen gas is as follows.

A decomposer 10 may perform a decomposition step of decomposing ammonia-containing gas M to generate decomposition-product gas N and exhaust gas a.

A first heat exchanger 5 may heat-exchange between ammonia ($NH_3(l)$) in a liquid phase and the decomposition-product gas N transferred from the decomposer 10 to the first adsorber 11 to generate ammonia ($NH_3(g)$) in a gas phase.

A second heat exchanger 4 may perform heat-exchange between exhaust gas a transferred from the decomposer 10 and the ammonia gas transferred from the first heat exchanger 5 to increase the temperature of the ammonia to a decomposition reaction temperature.

The first adsorber 11 may perform a first adsorption step of adsorbing and removing the undecomposed ammonia from the decomposition-product gas n heat-exchanged in the first heat exchanger 5 to generate first product gas P and the first off gas e.

A second adsorber 12 may perform a second adsorption step of generating higher-purity hydrogen gas and second off gas B by adsorbing and removing nitrogen in the first product gas P.

The third heat-exchanger 3 may perform heat-exchange between the exhaust gas a and at least a portion b of the second off gas B transferred from the second adsorber 12.

In this case, the exhaust gas c heat-exchanged in the third heat exchanger 3 and the second off gas d heat-exchanged in the third heat-exchange step may regenerate the first adsorbent by desorbing ammonia adsorbed to the adsorbent in the first adsorber 11.

In addition, second off gas d, which is obtained, as a portion of the second off gas B is heat-exchanged in the third heat exchanger 3, may be used as the heating-desorbing gas, and remaining second off gas b-1, which is not heat-exchanged, may be used as cooling-cleaning gas. In this case, a portion, which is heat-exchanged in the third heat exchanger 3, of the second off gas B may be in the range of 10 to 40 volume %, or the range of 15 to 30 volume % based on the total volume of the second off gas B. In addition, the second off gas b-1, which is not heat-exchanged in the third heat exchanger 3, may be in the range of 60 to 90 volume %, or the range of 70 to 85 volume %, based on the total volume of the second off gas B.

The exhaust gas used for increasing the temperature of the adsorption bed in the second regeneration step may be transferred to a process of removing a nitrogen oxide and discharged to the atmosphere after the nitrogen oxide is removed. In other words, according to the present disclosure, the preparing method may additionally include a nitrogen oxide removing step in which the exhaust gas transferred from the second regeneration step is discharged after the nitrogen oxide is removed.

Figure 7:
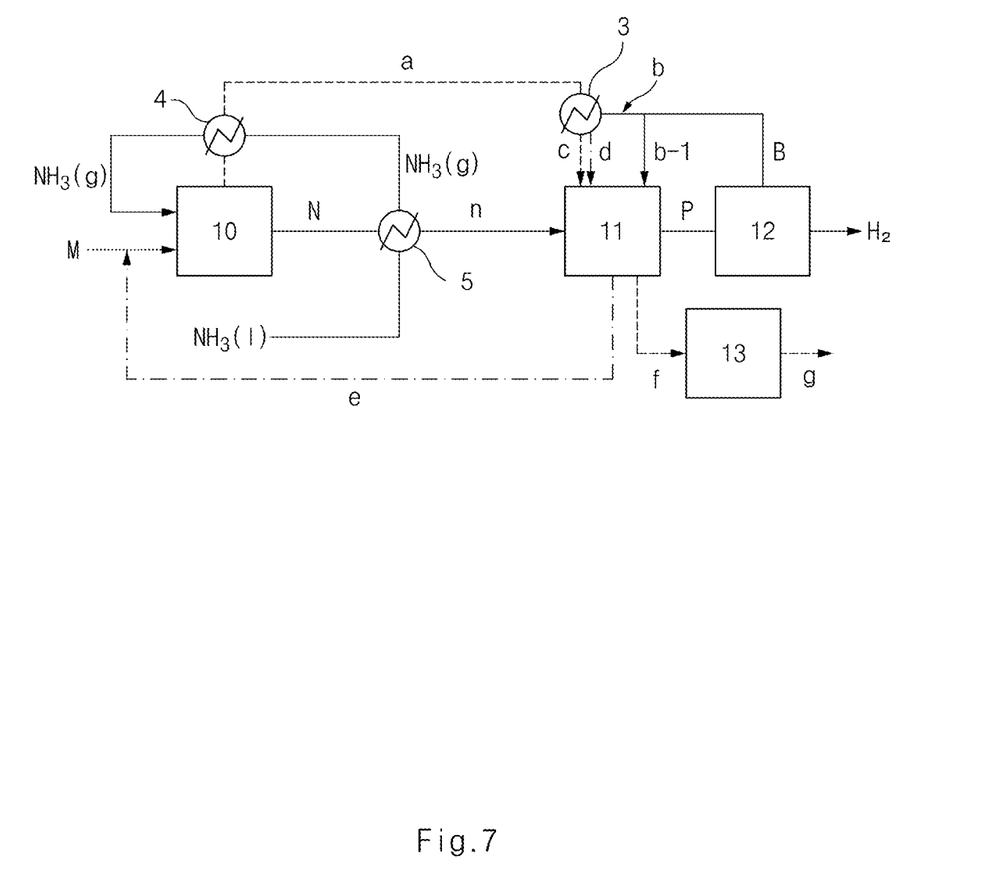
FIG. 7 is a flowchart illustrating a method for preparing hydrogen gas, according to an embodiment of the present disclosure.

Referring to FIG. 7, exhaust gas f transferred from the second regeneration step may be discharged to the atmosphere through a nitrogen oxide removing step 13 (see reference numeral g)

Nitrogen Oxide Removing Step

In the present step, the exhaust gas transferred from the second regeneration step may be discharged to the atmosphere after a nitrogen oxide ($NO_x$) from the exhaust gas.

The nitrogen oxide ($NO_x$) may be removed at the temperature in the range of 300° C. to 400° C. through a catalytic reaction. The temperature of the exhaust gas transferred from the second regeneration step is similar to the reaction temperature for removing the nitrogen oxide. Accordingly, the nitrogen oxide may be removed without an additional energy source. In other words, the temperature of the exhaust gas discharged from the second regeneration step may be the temperature appropriate to the reaction for removing the nitrogen oxide. Alternatively, the exhaust gas introduced into the nitrogen oxide removing step may have the temperature in the range of 300 to 450° C., or the range of 350 to 400° C.

As described above, according to the present disclosure, in the method for preparing hydrogen gas, as the waste heat of the exhaust gas and the off gas are heat-exchanged, the adsorbent may be effectively regenerated without the influence on the performance of the adsorbent when regenerating the adsorbent, while the system shows the excellent energy efficiency, thereby preventing the lifespan of the adsorbent from being reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for preparing hydrogen gas, the method comprising:

a decomposition step of decomposing ammonia-containing gas to produce decomposition-product gas, which contains nitrogen ($N_2$), hydrogen ($H_2$), and undecomposed ammonia, and exhaust gas;

a first adsorption step of adsorbing and removing the undecomposed ammonia contained in the decomposition-product gas by a first adsorbent to produce first product gas containing nitrogen ($N_2$) and hydrogen ($H_2$);

a second adsorption step of adsorbing and removing the nitrogen ($N_2$) contained in the first product gas by a second adsorbent to produce higher-purity hydrogen ($H_2$);

a first regeneration step of regenerating the second adsorbent by desorbing the nitrogen ($N_2$) adsorbed to the second adsorbent while generating second off gas containing nitrogen ($N_2$) and hydrogen ($H_2$); and a third heat-exchange step of heat-exchanging the exhaust gas transferred from the decomposition step and at least a portion of the second off gas transferred from the first regeneration step; and a second regeneration step of regenerating the first adsorbent after the first adsorption step by transferring, to the first adsorbent, the exhaust gas and the at least a portion of the second off gas, which are heat-exchanged in the third heat-exchange step and serve as heating-desorbing gas, and a remainder of the second off gas, which is transferred from the first regeneration step and serves as cooling-cleaning gas.

2. The method of claim 1, wherein the exhaust gas transferred from the decomposition step has a temperature in a range of 500° C. to 800° C., and wherein the second off gas transferred from the first regeneration step has a temperature of 20° C. to 50° C.

3. The method of claim 1, wherein the first adsorption step is performed through a thermal swing adsorption (TSA) manner.

4. The method of claim 1, wherein the second adsorption step is performed through a pressure swing adsorption (PSA) manner.

5. The method of claim 1, wherein the second off gas heat-exchanged in the third heat-exchange step has a temperature in a range of 400° C. or more and less than 600° C., and wherein the exhaust gas heat-exchanged in the third heat-exchange step has a temperature in a range of 500° C. or more and less than 650° C.

6. The method of claim 1, wherein the second regeneration step further includes:

additionally heat-exchanging the exhaust gas heat-exchanged in the third heat-exchange step with the first adsorbent to increase an ambient temperature of the first adsorbent.

7. The method of claim 6, wherein the second regeneration step further includes:

passing the at least a portion of the second off gas heat-exchanged in the third heat-exchange step through an adsorption bed while directly making contact with the first adsorbent, and heat-exchanging the exhaust gas heat-exchanged in the third heat-exchange step with the first adsorbent without directly making contact with the first adsorbent.

8. The method of claim 1, wherein the first adsorbent is filled in a plurality of adsorption beds.

9. The method of claim 8, wherein a number of the plurality of adsorption beds filled with the first adsorbent is three.

10. The method of claim 8, wherein a number of the plurality of adsorption beds, which are filled with the first adsorbent, is 2n+2, and wherein, "n" is a natural number.

11. The method of claim 8, further comprising:

passing the at least a portion of the second off gas, which is heat-exchanged in the third heat-exchange step, through at least one of the plurality of adsorption beds, and passing the exhaust gas heat-exchanged in the third heat-exchange step through a flow path for the exhaust gas.

12. The method of claim 1, further comprising:

a nitrogen oxide removing step of discharging the exhaust gas transferred from the second regeneration step, after a nitrogen oxide is removed.

13. The method of claim 1, wherein the first adsorbent includes at least one of a carbon-based material and a zeolite-based material.

14. The method of claim 8, further comprising repeating a cycle in each of the plurality of adsorption beds in the first adsorption step and the second regeneration step independently, the cycle sequentially includes:

an adsorbing process of adsorbing the undecomposed ammonia to the first adsorbent while supplying the decomposition-product gas, which is transferred from the decomposition step, to each of the plurality of adsorption beds;

a desorbing process of desorbing the adsorbed ammonia by allowing the at least a portion of the second off gas, which is heat-exchanged in the third heat-exchange step, to pass through each of the plurality of adsorption beds; and a cleaning process of cleaning the first adsorbent by allowing the remaining second off gas transferred from the second adsorption step to pass through each of the plurality of adsorption beds.

15. The method of claim 14, wherein the plurality of adsorption beds in the first adsorption step and the second regeneration step include at least three adsorption beds individually performing the adsorbing process, the desorbing process, and the cleaning process, and alternately performing the cycle in sequence of the adsorbing process, the desorbing process, and the cleaning process.

16. The method of claim 1, wherein the second regeneration step further includes: generating first off gas including undecomposed ammonia, which is adsorbed to the first adsorbent and serves as a by-product, nitrogen ($N_2$), and hydrogen ($H_2$), and recirculating the first off gas to the decomposition step.

17. The method of claim 1, further comprising:

a first heat-exchange step of generating ammonia in a gas phase by heat-exchanging ammonia in a liquid phase with the decomposition-product gas, which is transferred from the decomposition step to the first adsorption step;

a second heat-exchange step of increasing a temperature of the ammonia in the gas phase by heat-exchanging the ammonia in the gas phase with the exhaust gas transferred from the decomposition step; and introducing the ammonia heat-exchanged in the second heat-exchange step into the decomposition step.

* * * * *